United States Patent
Rowe

(10) Patent No.: US 10,417,409 B2
(45) Date of Patent: Sep. 17, 2019

(54) SECURING CREDENTIALS WITH OPTICAL SECURITY FEATURES FORMED BY QUASI-RANDOM OPTICAL CHARACTERISTICS OF CREDENTIAL SUBSTRATES

(71) Applicant: HID GLOBAL CORPORATION, Austin, TX (US)

(72) Inventor: Robert K. Rowe, Corrales, NM (US)

(73) Assignee: HID Global Corp., Austin, TX (US)

(*) Notice: Subject to any disclaimer, the term of this patent is extended or adjusted under 35 U.S.C. 154(b) by 203 days.

(21) Appl. No.: 15/464,684

(22) Filed: Mar. 21, 2017

(65) Prior Publication Data

US 2018/0276364 A1     Sep. 27, 2018

(51) Int. Cl.
*G06T 5/00*     (2006.01)
*B42D 25/43*     (2014.01)
(Continued)

(52) U.S. Cl.
CPC ........... *G06F 21/36* (2013.01); *B42D 25/305* (2014.10); *B42D 25/318* (2014.10);
(Continued)

(58) Field of Classification Search
CPC ......... G06F 21/36; G06F 21/32; G06T 5/004; B42D 25/445; B42D 25/435; B42D 25/351; B42D 25/318; B42D 25/43; B42D 25/305
See application file for complete search history.

(56) References Cited

U.S. PATENT DOCUMENTS 5,830,609 A   *   11/1998   Warner .................... B41M 3/14
                                                           430/10
8,171,567 B1   *   5/2012   Fraser ................... G06T 1/0021
                                                           726/32

(Continued)

FOREIGN PATENT DOCUMENTS

EP            3378670 A1     9/2018
FR            2910667 A1     6/2008
WO    WO-2005088533 A1     9/2005

OTHER PUBLICATIONS

"European Application Serial No. 18163083.1, Extended European Search Report dated Aug. 9, 2018", 8 pgs.

*Primary Examiner* — Michael Pyzocha
(74) *Attorney, Agent, or Firm* — Schwegman Lundberg & Woessner, P.A.

(57) ABSTRACT

Systems and methods are described for securing credentials with optical security features formed by quasi-random optical characteristics (QROCs) of credential substrates. A QROC can be a pattern of substrate element locations (SELs) on the substrate that includes some SELs that differ in optical response from surrounding SELs. During manufacturing, a QROC of a substrate can be characterized, hidden by a masking layer, and associated with a substrate identifier. During personalization, personalization data can be converted into an authentication graphic formed on the substrate by de-masking portions of the masking layer according to a de-masking pattern. The graphic formation can result in a representation that manifests a predetermined optical response only when the de-masking pattern is computed with knowledge of the hidden QROC. The authentication graphic and optical response can facilitate simple human authentication of the credential without complex or expensive detection equipment.

20 Claims, 8 Drawing Sheets

(51) Int. Cl.
  *G06F 21/32* (2013.01)
  *G06F 21/36* (2013.01)
  *B42D 25/305* (2014.01)
  *B42D 25/318* (2014.01)
  *B42D 25/351* (2014.01)
  *B42D 25/435* (2014.01)
  *B42D 25/445* (2014.01)

(52) U.S. Cl.
  CPC ............ *B42D 25/351* (2014.10); *B42D 25/43* (2014.10); *B42D 25/435* (2014.10); *B42D 25/445* (2014.10); *G06F 21/32* (2013.01); *G06T 5/004* (2013.01)

(56) References Cited

U.S. PATENT DOCUMENTS

| | | | | |
|---|---|---|---|---|
| 8,505,108 | B2* | 8/2013 | Rhoads | G06K 9/00577 713/176 |
| 2004/0076310 | A1* | 4/2004 | Hersch | B42D 25/342 382/100 |
| 2004/0233465 | A1* | 11/2004 | Coyle | B41M 3/008 358/1.9 |
| 2005/0001419 | A1 | 1/2005 | Levy et al. | |
| 2005/0006481 | A1 | 1/2005 | Han et al. | |
| 2008/0138604 | A1* | 6/2008 | Kenney | G06K 7/12 428/323 |
| 2008/0252066 | A1* | 10/2008 | Rapoport | B41M 1/14 283/94 |
| 2009/0122349 | A1* | 5/2009 | Bala | H04N 1/32203 358/3.28 |
| 2011/0090298 | A1* | 4/2011 | Bombay | B41M 5/26 347/232 |
| 2011/0101088 | A1* | 5/2011 | Marguerettaz | B41M 7/0081 235/375 |
| 2011/0187747 | A1* | 8/2011 | McCarthy | H04N 1/32219 345/634 |
| 2013/0003151 | A1* | 1/2013 | Takemori | G03F 7/001 359/3 |
| 2013/0163828 | A1* | 6/2013 | Seiler | G07D 7/00 382/112 |
| 2013/0181435 | A1* | 7/2013 | Hersch | H04N 1/6058 283/85 |
| 2014/0131989 | A1* | 5/2014 | Pohjola | B42D 25/45 283/85 |
| 2014/0239627 | A1* | 8/2014 | De Bougrenet | G02B 5/001 283/67 |
| 2014/0300095 | A1* | 10/2014 | Tompkin | B42D 25/30 283/67 |
| 2015/0248603 | A1* | 9/2015 | Lowenthal | G06K 19/06112 235/375 |
| 2015/0352886 | A1* | 12/2015 | Holmes | B42D 25/29 359/2 |
| 2016/0078785 | A1* | 3/2016 | Leary | G09C 5/00 380/54 |
| 2016/0246970 | A1* | 8/2016 | Otero | G06F 21/6209 |
| 2018/0065397 | A1* | 3/2018 | Noizet | B42D 25/45 |
| 2018/0093519 | A1* | 4/2018 | Dickerson | G02B 5/3016 |
| 2018/0178578 | A1* | 6/2018 | Tierney | B32B 9/00 |
| 2018/0196980 | A1* | 7/2018 | Holmes | B42D 25/425 |

* cited by examiner

SECURING CREDENTIALS WITH OPTICAL SECURITY FEATURES FORMED BY QUASI-RANDOM OPTICAL CHARACTERISTICS OF CREDENTIAL SUBSTRATES

FIELD

Embodiments relate generally to securing credentials, and, more particularly, to securing credentials with optical security features formed by quasi-random optical characteristics of credential substrates.

BACKGROUND

Many types of credentials include one or more human-discernable, optical security features on a laminated structure. If a nefarious individual obtains credential blanks, he may attempt unauthorized personalization of the credential by adding security features that appear authentic. Adding security features by printing, or the like, can often be performed with relatively inexpensive and ubiquitous technologies, and/or with little specialized knowledge or skill. Some credentials coat a substrate with an opaque coating, and add one or more security features by selectively causing certain regions of the opaque coating to become fully or partially transparent to the substrate below (e.g., by ablation or some other process). If the substrate and coating are of contrasting colors, such a process can be used to form a two-color (e.g., half-tone) personalization image (e.g., of the credential holder's face). Adding security features by ablation of a coating, or the like, can often involve be more difficult that simply printing or embossing a security feature. However, many such processes can still be relatively simple to spoof (e.g., to personalize the credential in a manner that is good enough to pass visual inspection, etc.) without specialized knowledge, skill, equipment, etc.

BRIEF SUMMARY

Among other things, systems and methods are described herein for securing credentials with optical security features formed by quasi-random optical characteristics (QROCs) of credential substrates. Embodiments operate in context of a credential substrate having a QROC that, during manufacturing, is characterized (e.g., formed and/or measured), hidden by a masking layer, and associated with a credential substrate identifier. The QROC can be defined according to a pattern of substrate element locations (SELs) on the substrate that includes some SELs that differ in optical response from their surrounding SELs. During personalization of the credential substrate, personalization data can be converted into a human-discernable representation of an authentication graphic that is formed on the substrate by de-masking portions of the masking layer according to a de-masking pattern. The graphic formation is performed in such a way that the resulting human-discernable representation manifests a predetermined authentication optical response only (i.e., with high statistical likelihood) when the de-masking pattern is computed with knowledge of the hidden QROC. For example, forming the image with knowledge of the QROC will yield an image with two colors only, while an image with three colors will likely be formed without knowledge of the QROC.

According to one set of embodiments, a method is provided for securing a credential using optical security features. The method includes: receiving personalization data for personalizing a substrate associated with an identifier; retrieving a quasi-random optical characteristic (QROC) of the substrate according to the identifier, the QROC defined according to a number of substrate element locations (SELs) on the substrate, at least a first portion of the SELs each manifesting a first optical response, and at least a second portion of the SELs interspersed with the first SELs and each manifesting a second optical response that is different from the first optical response, wherein, during manufacturing of the substrate, the QROC was recorded, optically obscured by a physical mask, and associated with the identifier; computing a de-masking pattern as a function of the personalization data and the QROC, such that the de-masking pattern defines a revealed set of the SELs of the QROC and an unrevealed set of the SELs of the QROC, which together form a human-discernable representation of an authentication graphic that manifests a predetermined authentication optical response; and de-masking portions of the physical mask according to the de-masking pattern, thereby forming the human-discernable representation of the authentication graphic on the substrate.

In some such embodiments, the de-masking pattern forms the human-discernable representation by revealing only SELs that manifest the first optical response, such that the predetermined authentication optical response corresponds to the first optical response. In other such embodiments, de-masking portions of the physical mask includes ablating portions of the physical mask to reveal a subset of the SELs defined according to the de-masking pattern. In other such embodiments, de-masking portions of the physical mask includes altering the transmittance of the physical mask to at least partially reveal a subset of the SELs defined according to the de-masking pattern.

Some such embodiments further include manufacturing the substrate by: forming the substrate; measuring the QROC over at least a region of the substrate; storing the measured QROC in association with the identifier to record the QROC; and obscuring the QROC by forming the physical mask over at least the region of the substrate. Other such embodiments further include manufacturing the substrate by: generating a QROC pattern to be substantially unique to the substrate; forming the substrate to include the QROC pattern; storing the generated QROC pattern in association with the identifier to record the QROC; and obscuring the QROC by forming the physical mask over at least the region of the substrate.

In some such embodiments, the substrate includes a surrounding material having material inclusions therein, one of the surrounding material or the material inclusions defining the first portion of the SELs, and the other of the surrounding material or the material inclusions defining the second portion of the SELs. In other such embodiments, the substrate is formed with a first layer manifesting the first optical response and a second layer manifesting the second optical response. As one implementation, the first layer is formed by printing the first portion of the SELs on the second layer. As another implementation, the first layer is formed on the second layer, and the first layer has first regions that define the first portion of the SELs and second regions that reveal underlying portions of the second layer, thereby defining the second portion of the SELs. In some such embodiments, the first optical response is a first color and the second optical response is a second color. In other such embodiments, the first optical response is a first transmittance and the second optical response is a second transmittance.

In some such embodiments, the first portion of the SELs includes a number of pixels each manifesting the first optical response. In other such embodiments, the first portion of the SELs includes a number of alphanumeric characters quasi-randomly arranged on the substrate, each character manifesting the first optical response. In other such embodiments, the first portion of the SELs includes a number of geometric elements quasi-randomly arranged on the substrate, each geometric element manifesting the first optical response. In some such embodiments, the human-discernable representation is a half-tone representation of the authentication graphic. In some such embodiments, the authentication graphic is personalized to the credential holder according to the received personalization data associated with the substrate.

According to another set of embodiments, a credential substrate is provided. The credential substrate includes: a number of first substrate element locations (SELs) each manifesting a first optical response; a number of second SELs interspersed with the first SELs and each manifesting a second optical response that is different from the first optical response, wherein the SELs define a quasi-random optical characteristic (QROC) of the substrate, which is recorded and associated with an identifier of the substrate during manufacturing of the substrate; and a physical mask formed over, and optically obscuring, at least a portion of the first and second SELs, wherein a portion of the physical mask is de-masked, according to a de-masking pattern computed as a function of the QROC and personalized data associated with a credential holder of the substrate, thereby forming, from a revealed set of the SELs, a human-discernable representation of an authentication graphic that manifests a predetermined authentication optical response.

In some such embodiments, the substrate includes a surrounding material having material inclusions therein, one of the surrounding material or the material inclusions defining the first portion of the SELs, and the other of the surrounding material or the material inclusions defining the second portion of the SELs. In other such embodiments, the substrate is formed with a first layer manifesting the first optical response, and a second layer manifesting the second optical response. In one implementation, the first layer is formed by printing the first portion of the SELs on the second layer. In another implementation, the first layer is formed on the second layer, and the first layer has first regions that define the first portion of the SELs and second regions that reveal underlying portions of the second layer, thereby defining the second portion of the SELs.

In some such embodiments, the first optical response is a first color and the second optical response is a second color. In other such embodiments, the first optical response is a first transmittance and the second optical response is a second transmittance. In some such embodiments, the first portion of the SELs includes a number of pixels each manifesting the first optical response. In other such embodiments, the first portion of the SELs includes a number of alphanumeric characters quasi-randomly arranged on the substrate, each character manifesting the first optical response. In other such embodiments, the first portion of the SELs includes a number of geometric elements quasi-randomly arranged on the substrate, each geometric element manifesting the first optical response. In some such embodiments, the human-discernable representation is a half-tone representation of the authentication graphic. In some such embodiments, the authentication graphic is personalized to the credential holder according to the received personalization data associated with the substrate.

According to another set of embodiments, a credential manufacturing system is provided. The system includes a personalization processor and a de-masker. The personalization processor operates to: receive personalization data for personalizing a substrate associated with an identifier; retrieve a quasi-random optical characteristic (QROC) pre-associated with the identifier of the substrate, the QROC defined according to a number of substrate element locations (SELs) on the substrate, at least a first portion of the SELs each manifesting a first optical response, and at least a second portion of the SELs interspersed with the first SELs and each manifesting a second optical response that is different from the first optical response, wherein, during manufacturing of the substrate, the QROC was recorded, optically obscured by a physical mask, and associated with the identifier; and compute a de-masking pattern as a function of the personalization data and the QROC, such that the de-masking pattern defines a revealed set of the SELs of the QROC and an unrevealed set of the SELs of the QROC, which together form a human-discernable representation of an authentication graphic that manifests a predetermined authentication optical response. The de-masker operates to de-mask portions of the physical mask according to the de-masking pattern, thereby forming the human-discernable representation of the authentication graphic on the substrate.

Some such embodiments further include a substrate former, in communication with the personalization processor, which operates to: produce the substrate to include the number of SELs that defines the QROC of the substrate; and form a physical mask over, and thereby optically obscure, at least a portion of the first and second SELs. Some such embodiments further include a QROC profiler that operates to: measure the QROC of the produced substrate prior to the substrate former forming the physical mask; and store the measured QROC in association with the identifier to record the QROC. In certain such embodiments, the substrate former further operates to generate a QROC pattern to be substantially unique to the substrate; the substrate former operates to produce the substrate to include the number of SELs in accordance with the generated QROC pattern; and the credential manufacturing system further includes a QROC profiler that operates to store the generated QROC in association with the identifier to record the QROC. In some such embodiments, the substrate former operates to produce the substrate to include the number of SELs by forming a layer manifesting the first optical response on an underlying layer of the substrate that manifests the second optical response. In other such embodiments, the substrate former operates to produce the substrate to include the number of SELs by forming the substrate from a surrounding material having material inclusions therein, one of the surrounding material or the material inclusions defining the first portion of the SELs, and the other of the surrounding material or the material inclusions defining the second portion of the SELs. In some such embodiments, the substrate former is in communication with the personalization processor over a secure network.

In some such embodiments, the de-masker operates to ablate portions of the physical mask to reveal a subset of the SELs defined according to the de-masking pattern. In other such embodiments, the de-masker operates to alter the transmittance of the physical mask to at least partially reveal a subset of the SELs defined according to the de-masking pattern. In other such embodiments, the de-masker operates to ablate portions of the physical mask to reveal a subset of the SELs defined according to the de-masking pattern. In some such embodiments, the human-discernable representation is a half-tone representation of the authentication graphic. In some such embodiments, the authentication graphic is personalized to the credential holder according to the personalization data received by the personalization processor.

BRIEF DESCRIPTION OF THE DRAWINGS

The present disclosure is described in conjunction with the appended figures.

The patent or application file contains at least one drawing executed in color. Copies of this patent or patent application publication with color drawings will be provided by the Office upon request and payment of the necessary fee.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Figure 1:
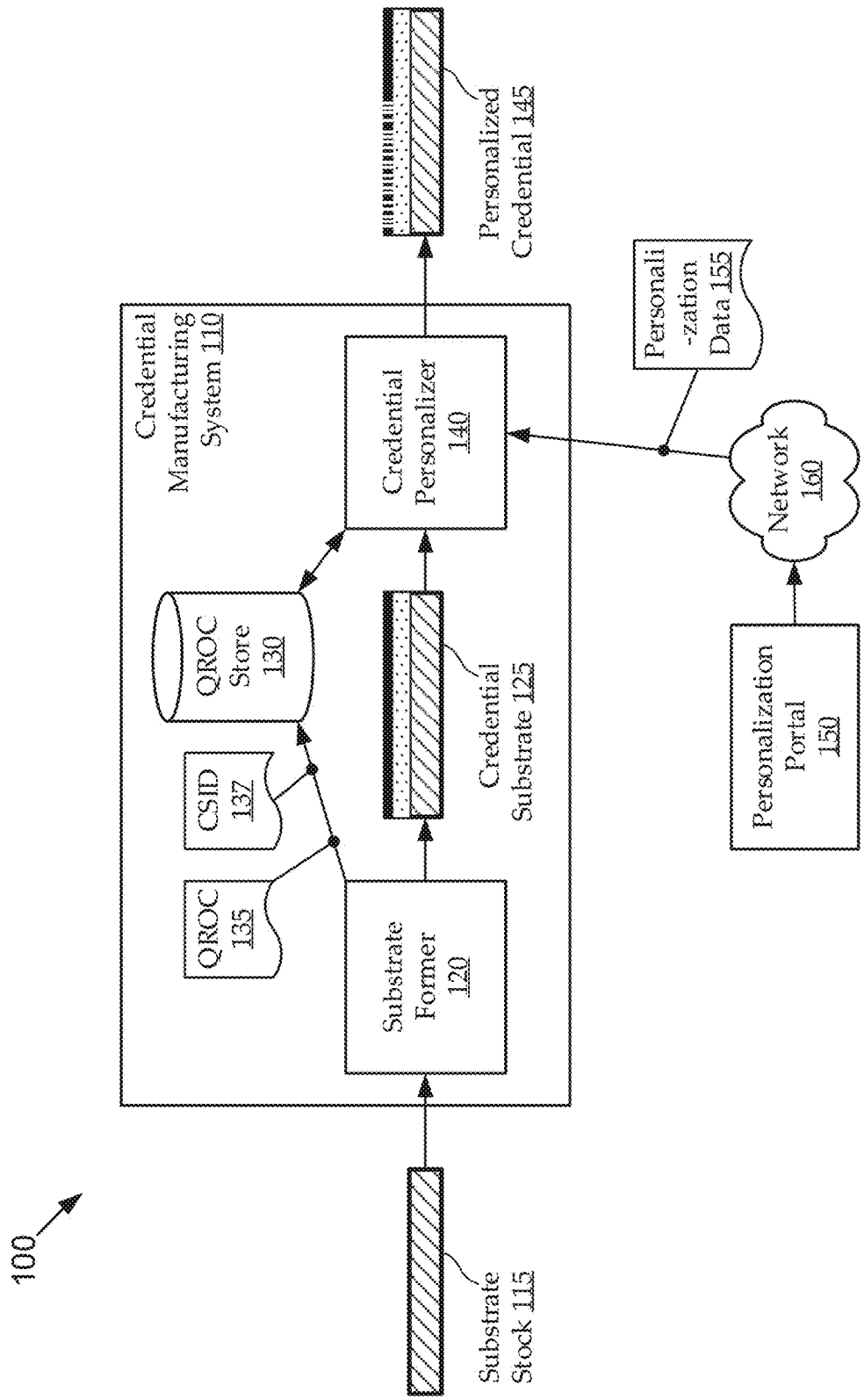
FIG. 1 shows a block diagram of a credential production environment including an illustrative credential manufacturing system, according to various embodiments.

FIG. 1 shows a block diagram of a credential production environment 100 including an illustrative credential manufacturing system 110, according to various embodiments. Embodiments of the credential manufacturing system 110 include a substrate former 120 and a credential personalizer 140. Various functionality and features can generally be categorized in two phases: a credential forming phase; and a credential personalization phase. For example, during the credential forming phase, the substrate former 120 can process substrate stock 115 into a credential substrate 125 (i.e., a non-personalized credential); and, during the credential personalization phase, the credential personalizer 140 can process the credential substrate 125 into a personalized credential 145 (i.e., having one or more personalized security features). Embodiments can include components and/or functions directed to either phase, or embodiments can include components and/or functions directed to both phases.

Many types of credentials (e.g., payment cards, identification cards, passports, etc.) are implemented with one or more human-discernable (e.g., printed, embossed, stamped, etched, etc.) optical security features on a laminated structure (e.g., a wallet card). If a nefarious individual obtains credential blanks (i.e., formed, coated credential substrates that have not yet been personalized), he may attempt unauthorized personalization of the credential by adding security features that appear authentic. Some conventional techniques for adding security features are relatively simple to spoof (e.g., to personalize the credential in a manner that is good enough to pass visual inspection, etc.). For example, adding security features by printing, or the like, can often be performed with relatively inexpensive and ubiquitous technologies (e.g., a standard printer), and/or with little specialized knowledge or skill (e.g., with simple visual inspection of an authentic credential for reference).

Some other conventional techniques implement credentials with a substrate covered by an opaque coating, and form one or more security features on the credentials by selectively causing certain regions of the opaque coating to become fully or partially transparent to the substrate below. For example, a thin metallic film or other material (e.g., a "mask") may be applied to a substrate during manufacture of a card blank. Subsequently when the credential is being individualized, portions of the coating may be ablated, oxidized, or otherwise made transparent to selectively reveal portions of the substrate below the coating. If the underlying substrate is a uniform color that visually contrasts with the coating (e.g. white substrate and a dark coating), a binary image of some kind can be formed in this manner. For example, where a personalization image is a gray-scale image (e.g., an image of the credential holder's face), such a binary process can be combined with standard halftone processing to yield a binary image that retains gray-scale characteristics of the original image. Adding security features by ablation of a coating, or the like, can often be more difficult that simply printing or embossing a security feature. However, many such processes can still be relatively simple to spoof without specialized knowledge, skill, equipment, etc.

Some embodiments are described herein for securing credentials with optical security features formed by quasi-random optical characteristics (QROCs) 135 of credential substrates. As used herein, "quasi-random" is intended to broadly encompass truly random characteristics; pseudo-random characteristics; characteristics that are not random per se, but are produced with a large number of variants such that the odds of a person guessing which of the variants a substrate contains are acceptably small; etc. As such, the QROC 135 can include any optically discernable, quasi-random pattern that is formed on, embedded in, inherent to, and/or otherwise associable with a particular substrate. The QROC 135 can be defined according to a pattern of substrate element locations (SELs) on the substrate. For example, each SEL can be a "pixel" (e.g., formed from a single "dot" or small array of dots or one or more colors), or any other suitable type of small, discrete location.

During the credential forming phase, embodiments of the substrate former 120 can form a credential substrate 125 to have a distinct QROC 135 (i.e., unique, or at least sufficiently unique to thwart unauthorized personalization, as described herein). The QROC 135 can include first SELs that manifest a first optical response (e.g., color, transmittance, etc.), and the first set of SELs can be interspersed with second SELs that manifest a second optical response that is different from the first optical response. In some embodiments, the QROC 135 is the result of random and uncontrollable phenomena (e.g., inherent variations in color, microstructure, etc. of the credential substrate material), thereby representing a physically unclonable function (PUF).

In some embodiments, the QROC 135 is defined by inherent variations in color, microstructure, etc. of the credential substrate material. For example, the substrate stock 115 can be manufactured from a material having metal-fleck or other inclusions, a swirl pattern from mixed materials, a granular pattern from metal or other materials, deliberate or undeliberate manufacturing variation (e.g., in color, transparency, etc.), and/or the like, which is sufficiently unique to each article (e.g., each cut piece of substrate stock 115) to be useful as the QROC 135. In other embodiments, the QROC 135 is produced by the substrate former 120 in an indeterminate manner. For example, the substrate former 120 can spray or splatter paint, etching solution, etc. on the substrate stock 115 to produce a quasi-random pattern of optically different SELs for use as the QROC 135. In other embodiments, the substrate former 120 can produce the QROC 135 in a relatively deterministic, but still quasi-random manner. For example, the substrate former 120 can use a predetermined function to generate a QROC pattern, which can be printed on the substrate stock 115 to form the QROC 135. In certain implementations, the function can be seeded by a pseudorandom number, by an identifier associated with the credential substrate 125 (e.g., the CSID, as described herein), by an identifier associated with a credential holder, issuer, etc.), or in any other suitable manner. While some QROC 135 implementations use the underlying substrate material as one SEL type (e.g., and one or more other SEL types are formed in context therewith), other QROC 135 implementations can form all the SELs that define the QROC 135. For example, a two-color QROC 135 can be formed by dispersing SELs of one color over a region of a substrate of a different color, so that unpainted portions of the region of the substrate become the second-color SELs of the QROC 135; or a region of the substrate can be completely covered with interspersed SELs of different colors, which together form the QROC 135 (i.e., without using the substrate color as part of the QROC 135 definition).

During manufacturing (during the credential forming phase), the QROC 135 can be characterized and stored in association with a credential substrate identifier (CSID) 137 in a QROC data store 130. For example, the QROC 135 can be treated as a bit-string, bit-array map, or other data map that represents an array of SELs in a defined region of the credential substrate 125. The QROC data store 130 can include any suitable type of storage, such as a tangible, non-transient, computer-readable storage medium, or set of storage media, that is collocated with the substrate former 120, in communication with the substrate former 120, etc. The CSID 137 can be any sufficiently unique identifier (e.g., alphanumeric string, binary string, image, etc.), for associating the QROC 135 with the credential substrate 125. Some embodiments store the QROC 135 in a manner that is sufficiently secure to thwart unauthorized access, such as by encryption, digital signing, etc. For example, storing the QROC 135 can involve computing a cryptographic hash as a function of the QROC 135 and the CSID 137.

The CSID 137 can be any sufficiently unique identifier (e.g., alphanumeric string, binary string, image, etc.), for associating the QROC 135 with the credential substrate 125. For example, the credential substrate 125 can be assigned a machine-readable serial number, or a representation of the QROC 135 (e.g., a digital signature) can be used as the CSID 137. The CSID 137 can be accessible on the credential substrate 125 itself, for example, by printing the CSID 137 on some (e.g., un-masked) portion of the credential substrate 125, by writing the CSID 137 to an RFID chip or other feature of the credential substrate 125, etc. In some embodiments, the CSID 137 is further obfuscated from unauthorized access, for example, by encryption, encoding, mapping to another identifier in a secure database, etc.

Having characterized the QROC 135 and stored the QROC 135 in association with the CSID 137 in the QROC data store 130, embodiments of the substrate former 120 can optically obscure the QROC 135 by forming a masking layer. In general, the masking layer produces an optical response that obscures one or more of the optical responses that define the QROC 135. In some implementations, the QROC 135 is defined by first SELs of a first color in context of SELs of a second color (e.g., black on white, red on white, ultraviolet on black, etc.), and the masking layer is a third color (e.g., black, silver, etc.). In another implementation, the QROC 135 is defined by first SELs of a first transmittance in context of SELs of a second transmittance (e.g., opaque on transparent, cloudy on clear, etc.), and the masking layer is a third transmittance (e.g., opaque). The transmittance can be with respect to one or more particular wavelengths (e.g., SELs and/or masking can differ in opacity with respect to visible light, ultraviolet or infrared light, a particular polarization of light, etc.). Other implementations can include combinations of color and transmittance and/or other optical responses (e.g., reflectance, scattering, etc.).

Figure 2A:
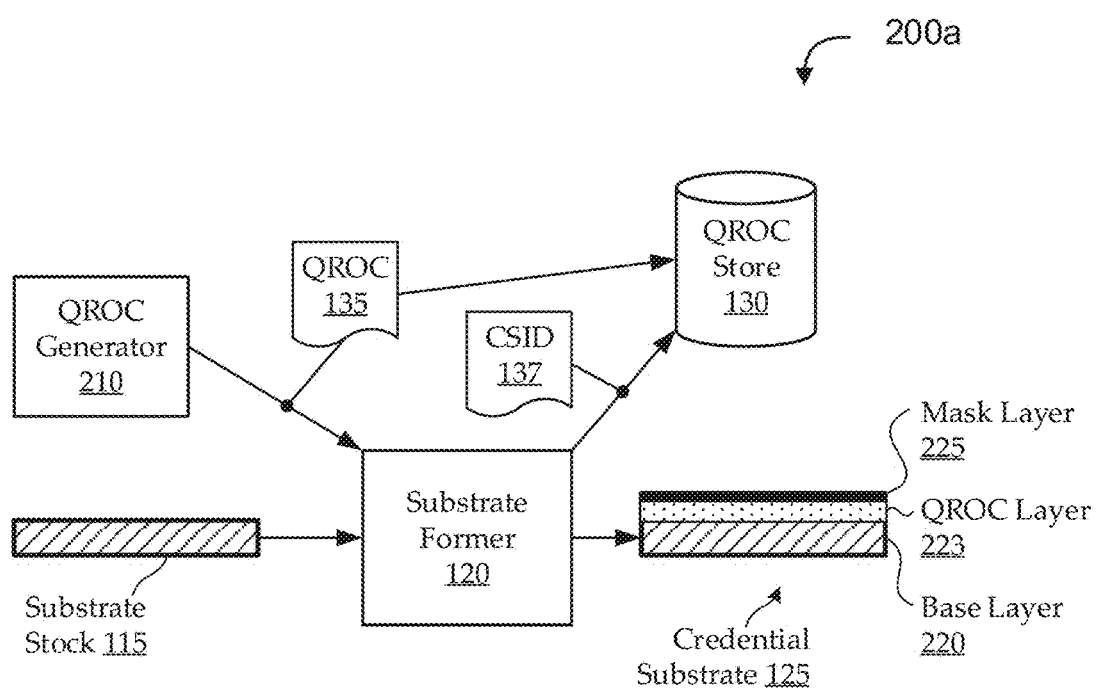
FIG. 2A shows a portion of a credential manufacturing system to illustrate some implementations of a credential forming phase using a substrate former.
Figure 2B:
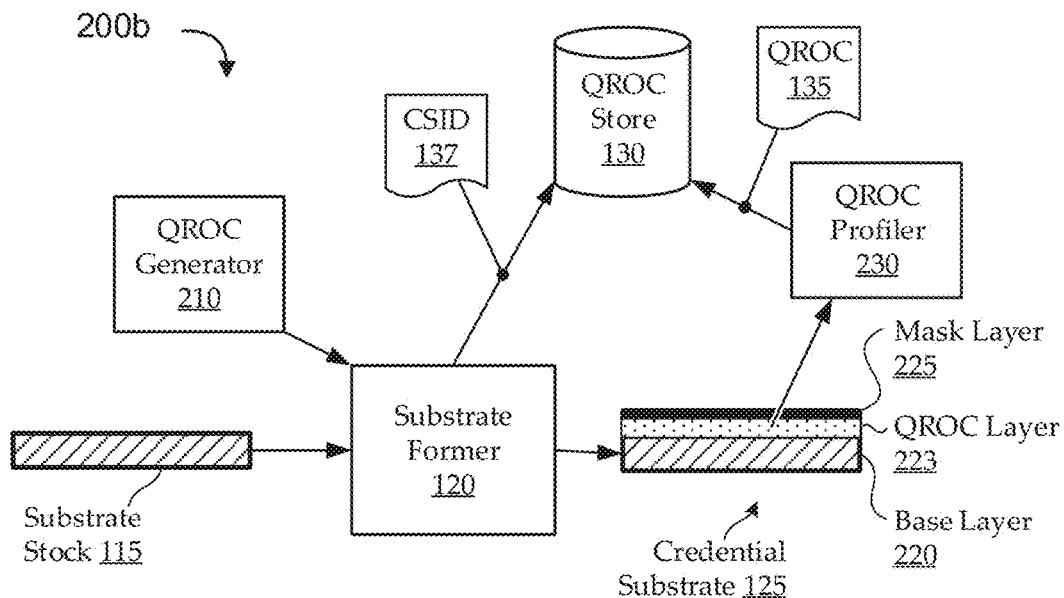
FIG. 2B shows a portion of a credential manufacturing system to illustrate other implementations of a credential forming phase using a substrate former.
Figure 2C:
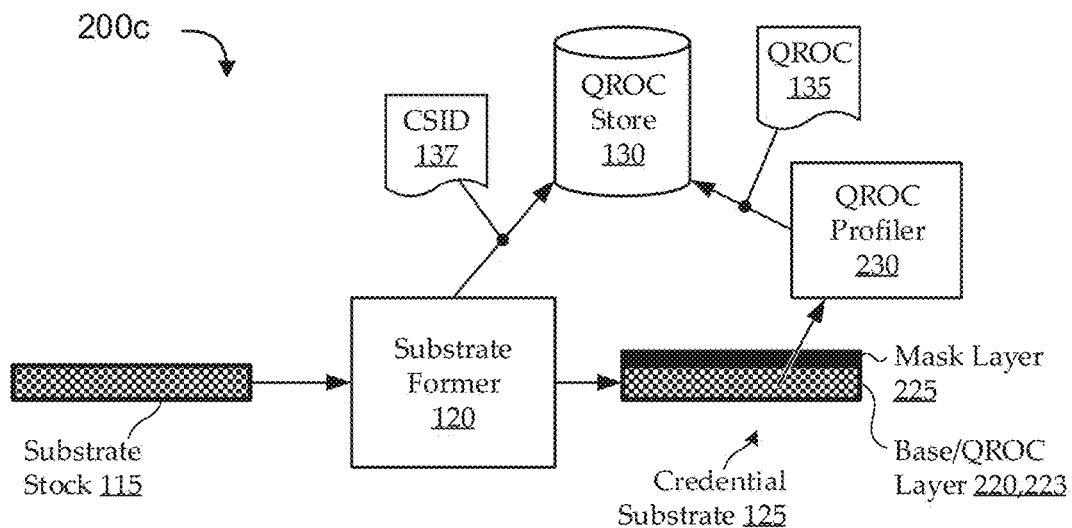
FIG. 2C shows a portion of a credential manufacturing system to illustrate still other implementations of a credential forming phase using a substrate former.

For the sake of added clarity, FIGS. 2A-C show examples of substrate former 120 implementations. Turning first to FIG. 2A, a portion of a credential manufacturing system 200a is shown to illustrate some implementations of a credential forming phase using a substrate former 120. As described with reference to FIG. 1, the substrate former 120 processes substrate stock 115 into a credential substrate 125. In the illustrated implementation, the substrate former 120 includes (or is in communication with) a QROC generator 210. The QROC generator 210 can deterministically generate a QROC pattern, which the substrate former 120 can use to form the QROC 135 on the substrate stock 115 in any suitable manner. For example, as described above, the QROC generator 210 can use a predetermined function to compute a QROC pattern, which can be printed, or otherwise incorporated with the substrate stock 115, to form the QROC 135. Embodiments of the substrate former 120 can further serialize and/or otherwise identify the credential substrate 125 with a sufficiently unique CSID 137. The QROC 135 can be stored in the QROC data store 130 in association with the CSID 137. After characterizing the QROC 135 and associating the QROC 135 with the CSID 137, the substrate former 120 can optically obscure the QROC 135.

While the substrate is referred to as the credential substrate 125 at various stages in the forming credential forming phase, the credential substrate 125 generally refers to the output of the credential forming phase. In particular, the substrate stock 115 with the QROC 135 optically obscured by a masking layer is generally referred to herein as the credential substrate 125; and this credential substrate 125 is provided to the credential personalizer 140 for adding personalized security features during the credential personalization phase. As illustrated, the credential substrate 125 output from the substrate former 120 can include three layers: a base layer 220, a QROC layer 223, and a masking layer 225. The base layer 220 generally refers to the substrate stock 115. The QROC layer 223 refers to the SELs (e.g., paint specks, printed characters, etc.) added in context of the substrate stock 115 to form the QROC 135. In some implementations, the QROC layer 223 can be implemented constructively to the substrate stock 115; while in other implementations, the QROC layer 223 can be implemented destructively to the substrate stock 115 (e.g., by removing sublayers or other elements of the substrate stock 115). The masking layer 225 includes the optically obscuring mask. In some implementations, one or more of the "layers" includes one or more sub-layers. For example, one implementation of the masking layer 225 includes a first sub-layer having a first polarization and a second sub-layer having a second (orthogonal) polarization; such that, in any particular location, the mask can be left opaque (i.e., with no layers removed), rendered fully transparent to the underlying SELs (i.e., by removing both layers), or rendered partially transparent to the underlying SELs (i.e., transparent to a particular polarization of light by removing the orthogonally polarized layer).

Turning to FIG. 2B, a portion of a credential manufacturing system 200b is shown to illustrate other implementations of a credential forming phase using a substrate former 120. As described with reference to FIG. 1, the substrate former 120 processes substrate stock 115 into a credential substrate 125. In the illustrated implementation, the substrate former 120 includes (or is in communication with) a QROC generator 210 (e.g., as described with respect to FIG. 2A) and a QROC profiler 230. In such implementations, it is assumed that the QROC 135 is not independently known (e.g., it was not generated by a deterministic function, or the like, as described with respect to FIG. 2A). In some embodiments of FIG. 2B, the QROC generator 210 can non-deterministically (e.g., randomly) generate a QROC pattern, which the substrate former 120 can use to form the QROC 135 on the substrate stock 115 in any suitable manner. For example, the QROC generator 210 can spray or splatter paint, etching solution, etc. on the substrate stock 115 to produce a quasi-random pattern of optically different SELs for use as the QROC 135.

Having formed the QROC 135, the QROC profiler 230 can measure the formed QROC 135 to generate a profile thereof. The profile can be any suitable representation, such as an image, a set of SEL values (e.g., SEL locations with associated color, intensity, transmittance, etc.), etc. The substrate former 120 can serialize and/or otherwise identify the credential substrate 125 with a sufficiently unique CSID 137; the profiled (measured) QROC 135 can be stored in the QROC data store 130 in association with the CSID 137; and the substrate former 120 can optically obscure the QROC 135 with a masking layer 225. As in FIG. 2A, the resulting credential substrate 125 can include a base layer 220, a QROC layer 223, and a masking layer 225.

Turning to FIG. 2C, a portion of a credential manufacturing system 200c is shown to illustrate still other implementations of a credential forming phase using a substrate former 120. As described with reference to FIG. 1, the substrate former 120 processes substrate stock 115 into a credential substrate 125. In the illustrated implementation, the substrate former 120 includes (or is in communication with) a QROC profiler 230 (e.g., without a QROC generator 210, in contrast to the implementations described in FIGS. 2A and 2B). As in FIG. 2B, in such implementations, it is assumed that the QROC 135 is not independently known (e.g., it was not generated by a deterministic function, or the like, as described in FIG. 2A). Instead, it can be assumed that the QROC 135 is defined by inherent variations in color, microstructure, etc. of the substrate stock 115. As in FIG. 2B, the QROC profiler 230 can measure the QROC 135 in any suitable manner to generate a profile thereof. The substrate former 120 can serialize and/or otherwise identify the credential substrate 125 with a sufficiently unique CSID 137; the profiled (measured) QROC 135 can be stored in the QROC data store 130 in association with the CSID 137; and the substrate former 120 can optically obscure the QROC 135 with a masking layer 225. Because the QROC 135 is part of the substrate stock 115, the resulting credential substrate 125 can include only two layers: a base/QROC layer (i.e., having combined properties of the base layer 220 and the QROC layer 223), and a masking layer 225.

Returning to FIG. 1, during the credential personalization phase, the credential substrate 125 can be processed by the credential personalizer 140 to form a personalized credential 145. The credential personalization phase can be used to associate the credential substrate 125 with a particular credential holder, issuer (e.g., issuing bank, organization, government agency, etc.), etc. Embodiments of the credential personalizer 140 can receive personalization data 155 in any suitable manner. In some implementations, the personalization data 155 is retrieved from a database of credential holders, issuers, or the like that may be in a queue or otherwise scheduled for receipt of a credential. In other implementations, the personalization data 155 is received from a personalization portal 150 (e.g., over a network 160). The personalization portal 150 can be implemented as software on, and/or accessible via, a personal computer (e.g., desktop computer, mobile device, etc.) of a credential holder or issuer, and/or any other suitable platform. For example, the personalization portal 150 can be a web portal hosted on one or more web servers and accessible via one or more public or private networks. The personalization data 155 can include any suitable information for personalizing the credential. Some personalization data 155 can include information specific to the credential holder, such as a facial image, fingerprint, genetic information, signature, passphrase, etc. Other personalization data 155 can include information specific to a particular issuer, shared by all members of a particular group, etc., such as a predetermined logo, image, phrase, alphanumeric string, etc.

During personalization of the credential substrate 125, personalization data 155 can be converted into a human-discernable representation of an authentication graphic that is formed on the credential substrate 125 by de-masking portions of the masking layer 225 according to a de-masking pattern. The graphic formation is performed in such a way that the resulting human-discernable representation manifests a predetermined authentication optical response only when the de-masking pattern is computed with knowledge of the hidden QROC 135 (i.e., it is statistically highly unlikely to produce the predetermined authentication optical response without knowledge of the QROC 135). For example, forming the image with knowledge of the QROC 135 will yield an image with two colors only, while an image with three colors will likely be formed without knowledge of the QROC 135. In some implementations, any difference in optical response from the predetermined authentication optical response can be easily detected by unaided visual inspection (e.g., by a human without special equipment, or with simple, inexpensive optics, etc.).

Figure 3:
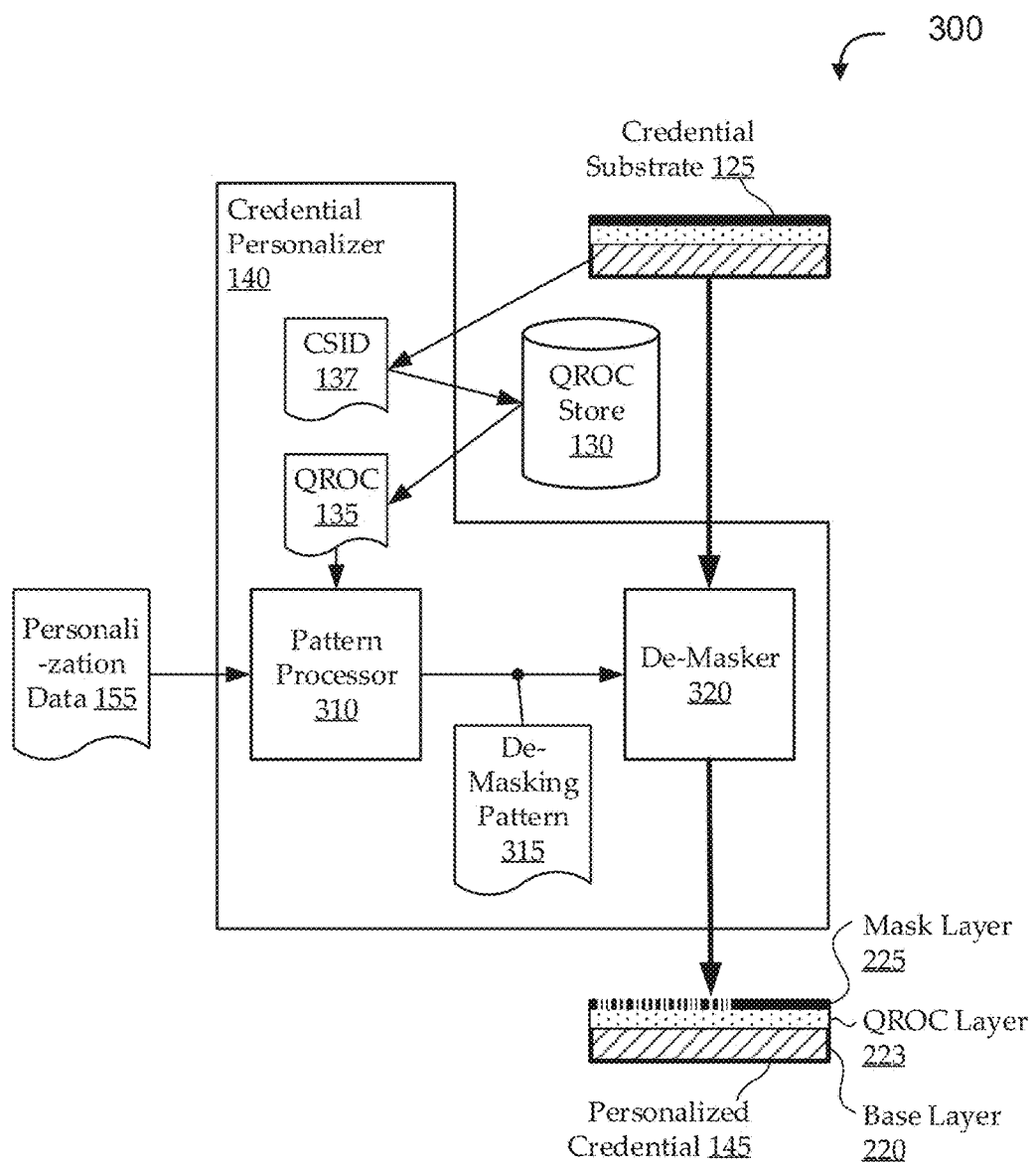
FIG. 3 shows a portion of a credential manufacturing system to illustrate some implementations of a credential personalization phase using a credential personalizer, according to various embodiments.

For added clarity, FIG. 3 shows a portion of a credential manufacturing system 300 to illustrate some implementations of a credential personalization phase using a credential personalizer 140, according to various embodiments. As described with reference to FIG. 1, the credential personalizer 140 processes a credential substrate 125 into a personalized credential 145. As illustrated, some embodiments of the credential personalizer 140 include (or are in communication with) a pattern processor 310 and a de-masker 320.

Embodiments of the pattern processor 310 can retrieve personalization data 155 in any suitable manner, as described above. Embodiments of the pattern processor 310 can further retrieve the QROC 135 associated with the credential substrate 125 in accordance with its CSID 137. For example, the CSID 137 can be printed on the credential substrate 125, stored in an RFID chip or other storage element of the credential substrate 125, and/or otherwise accessible by the pattern processor 310 directly or indirectly from the credential substrate 125 itself. Some embodiments query the QROC data store 130 (e.g., shown for context) using the CSID 137 to retrieve the QROC 135.

Using the retrieved personalization data 155 and QROC 135, the pattern processor 310 can compute a de-masking pattern 315. The de-masking pattern 315 is computed so as to define a revealed set of the SELs of the QROC 135 and an unrevealed set of the SELs of the QROC 135, which together form a human-discernable representation of an authentication graphic that manifests a predetermined authentication optical response. For example, locations of the masking layer 225 can be mapped to SELs of the underlying (obscured) QROC layer 223, and the de-masking pattern 315 can define which of the QROC layer 223 SELs to reveal (partially or fully) to form the desired authentication graphic with the desired optical response by "de-masking" corresponding masking layer 225 locations. As used herein, de-masking can include any suitable manner of partially or fully revealing selected SELs underlying the masking layer 225. For example, lasers, chemicals, etc. can be used to ablate, etch, and/or otherwise affect the obscuring properties of the mask. Determining which locations of the masking layer 225 to de-mask and in what manner and to what degree can involve computing the de-masking pattern 315 to produce both the desired authentication graphic (e.g., any suitable image, string of characters, pattern, etc., formed from, or as a function of, the personalization data 155) and to produce the desired authentication optical response. As described above, the QROC 135 is defined and obscured in such a way that de-masking the masking layer 225 without knowledge of the QROC 135 is highly likely to produce an optical response that is easily discernable from the predetermined authentication optical response. For example, a half-toning algorithm can be modified to produce a representation of the authentication graphic that uses only particular SELs in accordance with the QROC 135 to produce the authentication optical response.

Embodiments of the de-masker 320 can de-mask portions of the masking layer 225 according to the de-masking pattern 315, thereby forming the human-discernable representation of the authentication graphic on the substrate in a manner that manifests the predetermined authentication optical response. In some embodiments, the de-masking pattern 315 forms the human-discernable representation by revealing only SELs in the QROC layer 223 that manifest the first optical response (e.g., by ablating or otherwise removing those locations of the masking layer 225, by making transparent, or otherwise altering the transmittance of those locations of the masking layer 225, etc.), and the predetermined authentication optical response corresponds to the first optical response. For example, suppose the base layer 220 is white and the QROC layer 223 includes dispersed red pixels, such that the base layer 220 and the QROC layer 223 together manifest a quasi-random, two-color (red and white) pattern of pixels (i.e., the QROC 135). De-masking with knowledge of the QROC 135 can produce an authentication graphic that is only red or only white; while de-masking without knowledge of the QROC 135 is likely to produce an image with red and white pixels.

Many implementations are possible for de-masking in a manner that produces both the desired authentication graphic and the desired authentication optical response. For example, the red-white implementation can be altered to use any combination of visible colors, non-visible colors (e.g., ultraviolet), transmittance (e.g., opaque, cloudy, translucent, clear, etc.), etc. Further, while each SEL in some implementations can be a "dot" or other small, discrete region having a particular color; each SEL in some other implementations can include one or more alphanumeric characters, geometric features (e.g., curved lines, shapes, logos, etc.), arrays of microdots, glyphs, etc. Further, while the types of implementations described above can generally effectively manifest a three-color (or three-optical response) effect (i.e., a two-response QROC 135 with a third-response masking layer 225), the masking layer 225 can alternatively manifest substantially the same optical response as one of the SEL types that makes up the QROC 135, thereby manifesting a two-response effect.

Some other implementations manifest more complex and/or higher-order effects (e.g., more than three optical responses). In some such implementations, each SEL can include an array of sub-SELs having a repeating, quasi-random, or other pattern, each having multiple colors, grey-scale levels, levels of transmittance, levels of reflectivity, etc. In one such implementation, each SEL can be a pixel comprised of red, green, and blue sub-pixels (e.g., according to a Bayer pattern, as an R-G-B triple, etc.). In another similar implementation, relative locations of the red, green, and blue sub-pixels can be unordered or randomized in some way, and those relative locations can be characterized as part of the QROC 135. In either implementation, the de-masking pattern 315 can define locations of the masking layer 225 to de-mask in accordance with the sub-pixels, so that the de-masking can reveal a multi-color authentication graphic, such as a full-color image, an image manifesting a macro color pattern (e.g., a color gradient across the image), etc. For example, unauthorized personalization is likely to result in a muddy color appearance, an absence of a defined color pattern, etc.

Characteristics of the QROC 135, the masking layer 225, the de-masking process, etc. can impact the techniques available for authentication. Some implementations produce an authentication graphic that manifests an authentication optical response that is easily discernable by a human without any additional apparatus. For example, presence or absence of particular colors, color patterns, transmittance, etc. can be easily detected by an unaided human eye in typical ambient lighting conditions. Other implementations produce an authentication graphic that manifests an authentication optical response that is easily discernable by a human, but only with additional apparatus. For example, special optics can reveal presence or absence of ultraviolet or infrared features or patterns, particular polarization effects, etc. Further, some authentication can involve additional factors. For example, the personalized credential 145 can include one or more security features added to the credential by other processes (e.g., by printing, embossing, engraving, storing on-board, etc.) that can be compared or contrasted with the authentication graphic and/or its manifested authentication optical response.

Figure 4:
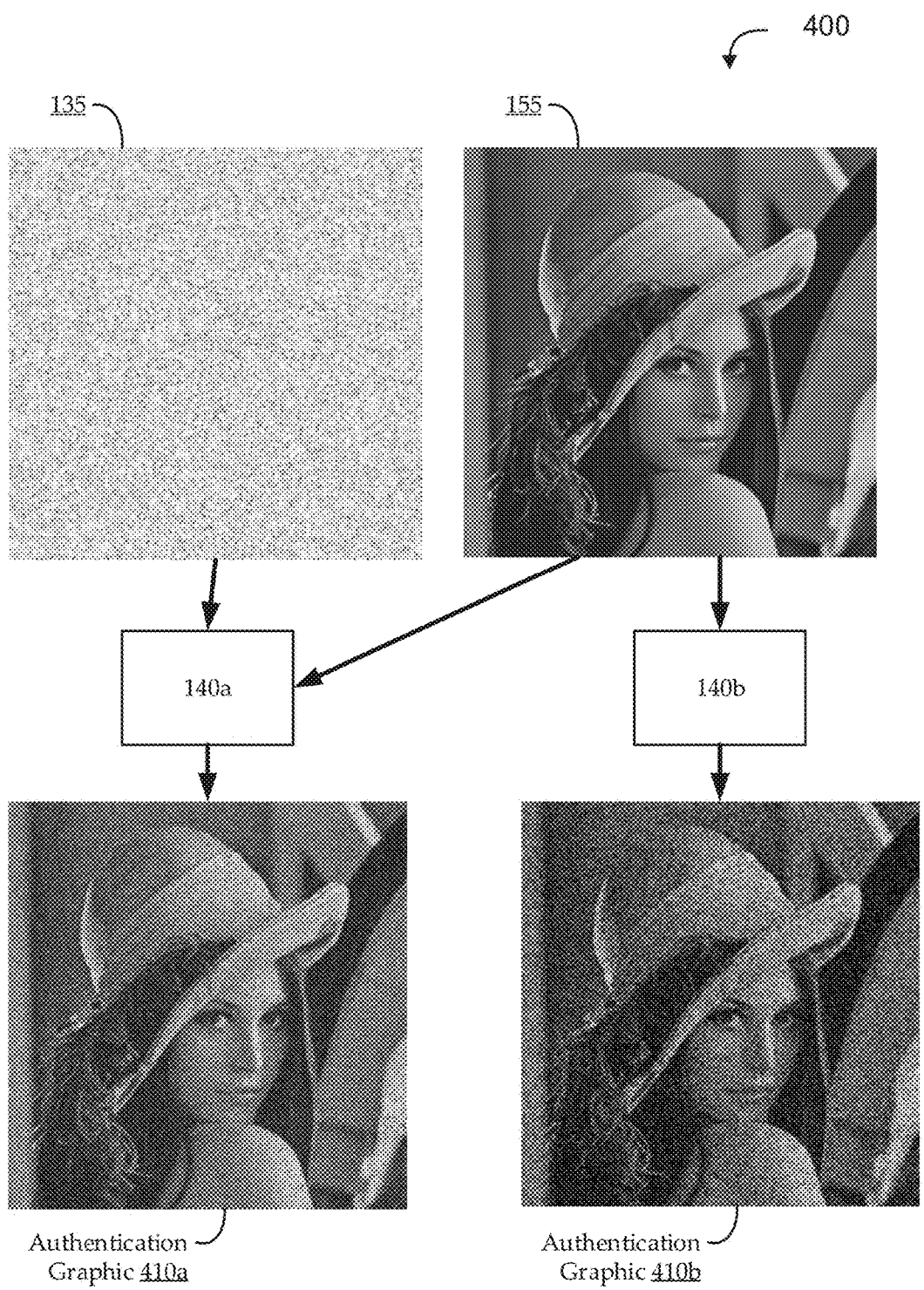
FIG. 4 shows an example to illustrate authorized versus unauthorized personalization of a credential substrate (COLOR)

FIG. 4 shows an example to illustrate authorized versus unauthorized personalization of a credential substrate 125 (i.e., formation of an authentication graphic with and without knowledge of a QROC 135 associated with the credential substrate 125, respectively). The illustrated example computes a de-masking pattern 315 as a function of a QROC 135 and a personalization image. The QROC 135 is a two-color (red and white) pattern of 512-by-512 pixels (i.e., SELs), where twenty percent of the pixels are red. The personalization image is a 512-by-512-pixel greyscale facial image (e.g., retrieved as part of, or in accordance with, personalization data 155). As described above, it is assumed that the QROC 135 is characterized and obscured during the credential forming phase of manufacture, such that the red SEL locations are stored in association with a CSID 137 of the credential substrate 125.

Credential personalizer 140*a* is illustrated as having knowledge of the QROC 135. For example, credential personalizer 140*a* can read the CSID 137 from the credential substrate 125 and query the QROC data store 130 to retrieve the stored QROC 135 characterization. Credential personalizer 140*a* can apply its knowledge of the QROC 135 to a half-toning algorithm to generate a de-masking pattern 315, which it can use to de-mask locations of the masking layer 225 to generate an authentication graphic 410*a* in a manner that avoids all the red SELs defined as part of the QROC 135. As shown, the resulting authentication graphic 410*a* is a halftone image formed with only black and white pixels (i.e., no red is visible).

In contrast, credential personalizer 140*b* is illustrated as having no knowledge of the QROC 135 (e.g., it has access only to the personalization image as an unauthorized personalizer). Without knowledge of the QROC 135, credential personalizer 140*b* can use a half-toning algorithm to generate a de-masking pattern 315, which it can use to de-mask locations of the masking layer 225 to generate an authentication graphic 410*b*. However, as shown, the resulting authentication graphic 410*b* includes a large number of visible red pixels, which is easily discernable as different from the desired authentication optical response.

Figure 5:
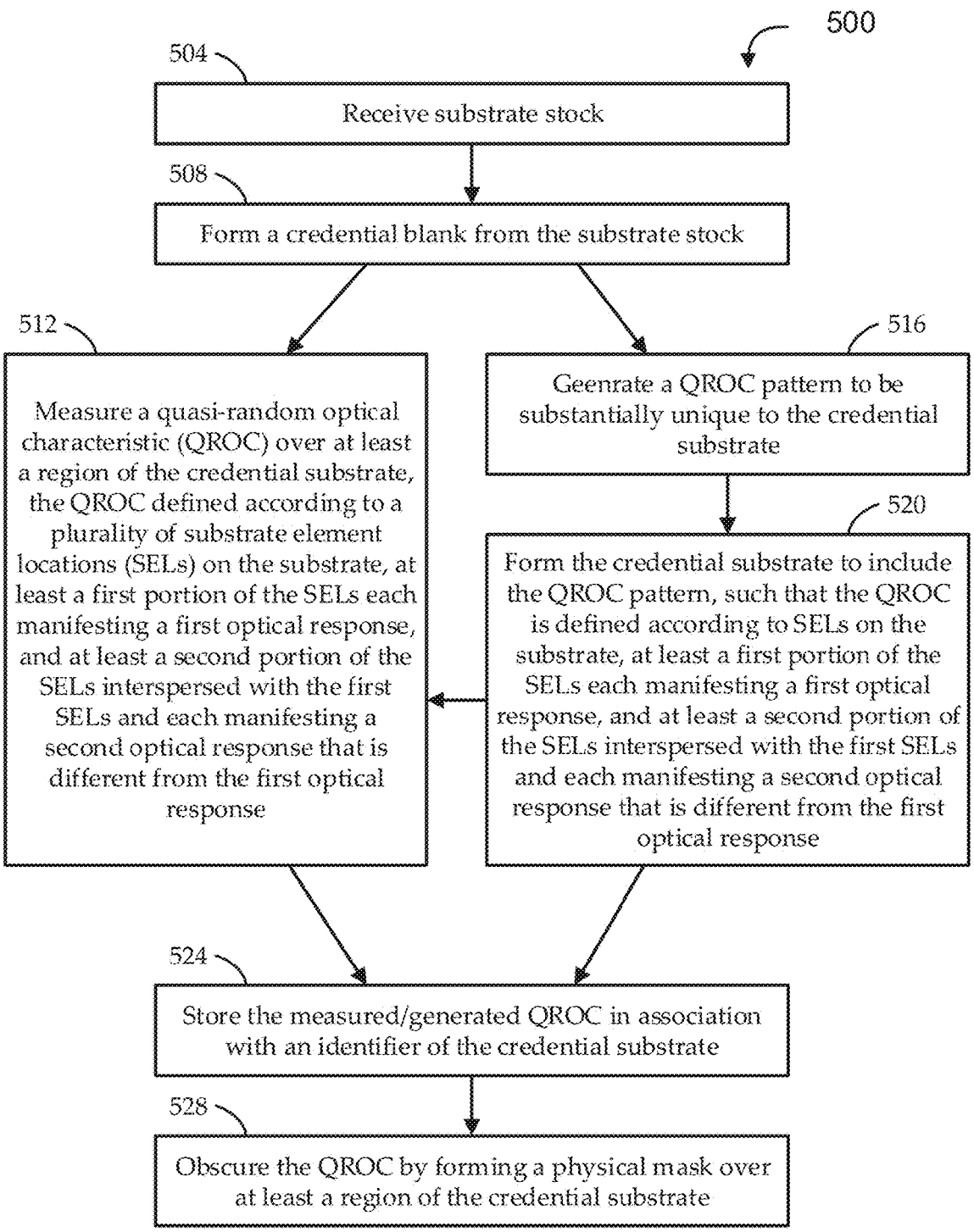
FIG. 5 shows a flow diagram of an illustrative method for forming a credential that supports optical security by quasi-random optical characteristics of credential substrates, according to various embodiments.

FIG. 5 shows a flow diagram of an illustrative method 500 for forming a credential that supports optical security by quasi-random optical characteristics of credential substrates, according to various embodiments. Embodiments of the method 500 begin at stage 504 by receiving substrate stock. A credential blank can be formed from the substrate stock at stage 508. For example, forming the blank can include cutting the stock, etc. Embodiments can proceed by characterizing a quasi-random optical characteristic (QROC) of the credential substrate, which can be performed in various manners. For example, the QROC is defined according to substrate element locations (SELs) on the substrate, at least a first portion of the SELs each manifesting a first optical response, and at least a second portion of the SELs interspersed with the first SELs and each manifesting a second optical response that is different from the first optical response.

In some embodiments, at stage 512, the QROC can be measured over at least a region of the credential substrate.

For example, the QROC can be a characteristic of the substrate, such that characterizing of the QROC involves recording that characteristic pattern. In other embodiments, at stage 516, the QROC can be generated to be substantially unique to the credential substrate, and the generated QROC can be applied to the substrate at stage 520. In some such implementations, the QROC is generated in a manner that it is effectively pre-characterized so that no measurement is needed. In other such implementations, the QROC is generated in a manner that is unpredictable or otherwise unknown without measuring the physical result formed in stage 520. Accordingly, after the forming at stage 520, some implementations measure the QROC at 512, as described above.

At stage 524, embodiments can store the characterized QROC in accordance with a credential substrate identifier (CSID). Some implementations of stage 524 include serializing the credential substrate, the QROC, etc., or using any other suitable technique, to generate the CSID. At stage 528, embodiments can form a masking layer on the credential substrate in a manner that optically obscures the QROC.

Figure 6:
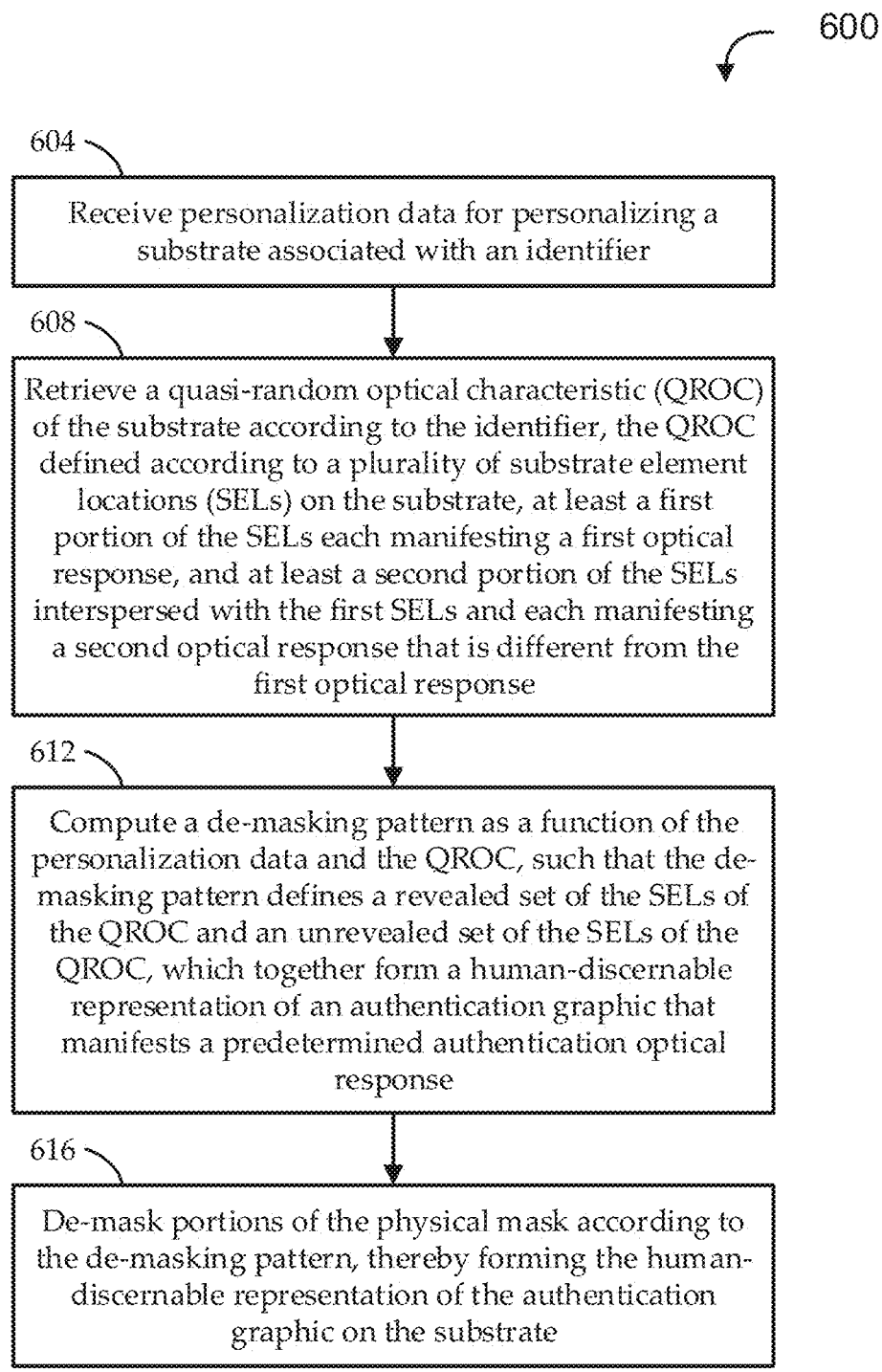
FIG. 6 shows a flow diagram of an illustrative method for personalizing a credential in a manner that exploits quasi-random optical characteristics of credential substrates, according to various embodiments.

FIG. 6 shows a flow diagram of an illustrative method 600 for personalizing a credential in a manner that exploits quasi-random optical characteristics of credential substrates, according to various embodiments. Embodiments of the method 600 begin at stage 604 by receiving personalization data for personalizing a substrate associated with an identifier (e.g., a CSID). At stage 608, embodiments can retrieve a quasi-random optical characteristic (QROC) of the substrate according to the identifier. As described above, the QROC can be defined according to substrate element locations (SELs) on the substrate, at least a first portion of the SELs each manifesting a first optical response, and at least a second portion of the SELs interspersed with the first SELs and each manifesting a second optical response that is different from the first optical response. As described above, it can be assumed that the QROC was recorded, optically obscured by a physical mask, and associated with the identifier during manufacturing (forming) of the substrate. In some embodiments, retrieving the QROC can involve retrieving the identifier from the credential.

At stage 612, a de-masking pattern can be computed as a function of the personalization data (received at stage 604) and the QROC (retrieved at stage 608). The de-masking pattern can define a revealed set of the SELs of the QROC and an unrevealed set of the SELs of the QROC, which together form a human-discernable representation of an authentication graphic that manifests a predetermined authentication optical response. In some implementations, the de-masking pattern can define which portions of the mask to "de-mask," to what extent, etc. At stage 620, embodiments can de-mask portions of the physical mask according to the de-masking pattern, thereby forming the human-discernable representation of the authentication graphic on the substrate.

Figure 7:
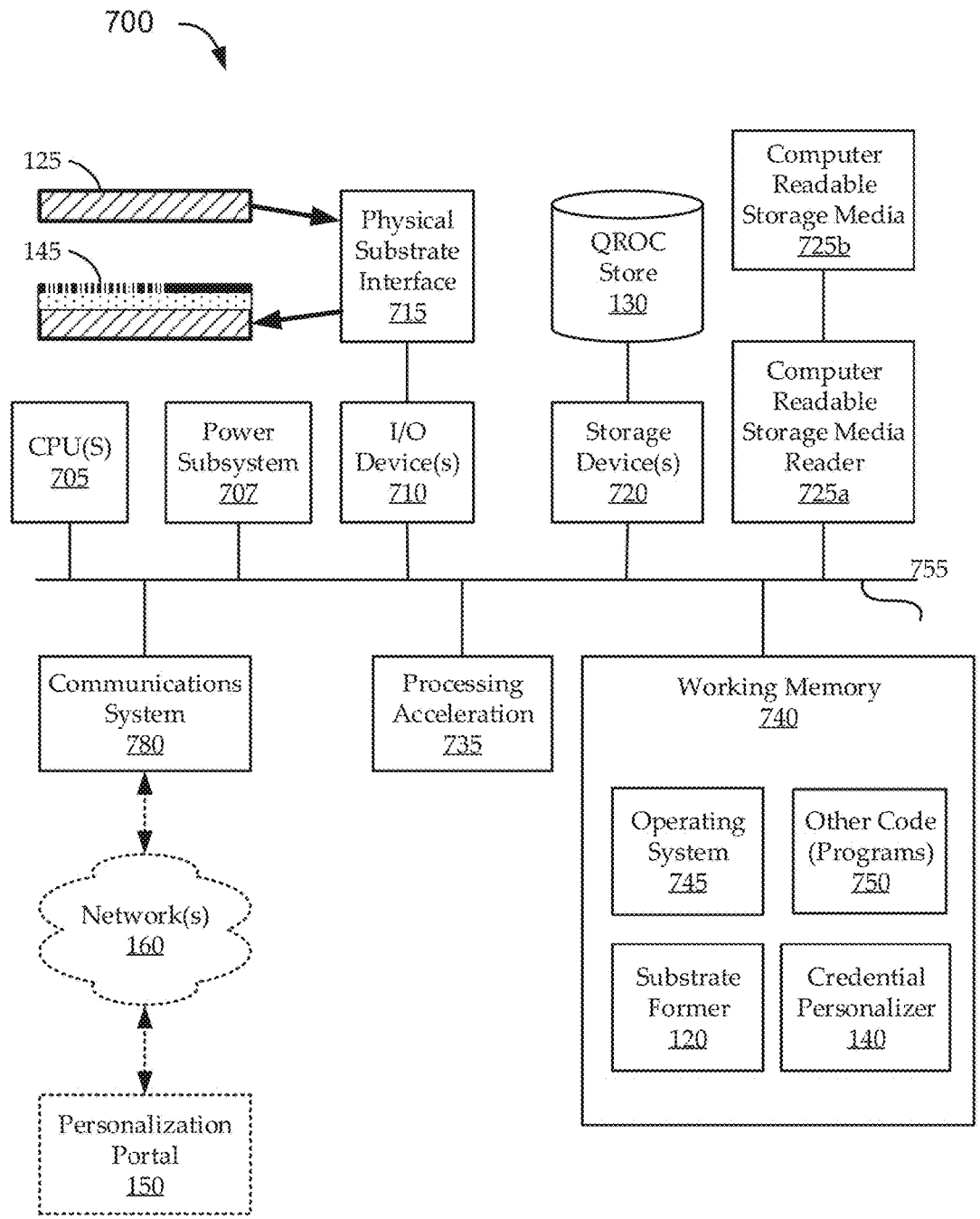
FIG. 7 shows an exemplary computational environment for implementing optical security features formed by quasi-random optical characteristics of credential substrates, according to various embodiments.

The methods of FIGS. 5 and 6 can be implemented using any of the systems described with reference to FIGS. 1-3 and/or other system implementations; and the systems described with reference to FIGS. 1-3 can implement methods other than those described with reference to FIGS. 5 and 6. Some of the functions of the methods and systems described herein can be implemented in one or more computational environments. FIG. 7 shows an exemplary computational environment 700 for implementing optical security features formed by quasi-random optical characteristics of credential substrates, according to various embodiments. The computational environment 700 can be implemented as or embodied in single or distributed computer systems, or in any other useful way. The computational environment 700 is shown including hardware elements that may be electrically coupled via a bus 755.

The hardware elements may include one or more central processing units (CPUs) and/or other processor(s) 705. Implementations can also include one or more input/output devices 710, which can include and or be integrated with a physical substrate interface 715. For example, the physical substrate interface 715 can receive and/or physically process substrate stock 115, credential substrates 125, personalized credentials 145, etc. Some implementations also include a power subsystem 707, including any suitable power storage, power electronics, power interfaces, etc. Some implementations can permit data to be exchanged, via a communications subsystem 780, with one or more networks (e.g., with a personalization portal 150 via network 160) and/or any other computer or external system. The communications subsystem 780 can include a modem, a network card (wireless or wired), an infrared communication device, and/or any other suitable components or combinations thereof.

The computational environment 700 can also include one or more storage devices 720. By way of example, storage device(s) 720 may be disk drives, optical storage devices, solid-state storage device such as a random access memory (RAM) and/or a read-only memory (ROM), which can be programmable, flash-updateable and/or the like. The computational environment 700 can additionally include a computer-readable storage media reader 725a, and working memory 740, which may include RAM and ROM devices as described above. The computer-readable storage media reader 725a can further be connected to a computer-readable storage medium 725b, together (and, optionally, in combination with storage device(s) 720) comprehensively representing remote, local, fixed, and/or removable storage devices plus storage media for temporarily and/or more permanently containing computer-readable information. The storage device(s) 720, computer-readable storage media and media reader 725, and/or working memory 740 can be used to implement the QROC data store 130. In some embodiments, the computational environment 700 can also include a processing acceleration unit 735, which can include a DSP, a special-purpose processor and/or the like.

The computational environment 700 may also include software elements, shown as being currently located within a working memory 740, including an operating system 745 and/or other code 750, such as an application program (which may be a client application, web browser, mid-tier application, etc.). For example, embodiments can be implemented as instructions, which, when executed by one or more processors 705, cause the processors 705 to perform certain functions. Such functions can include functionality of the substrate former 120 and/or the credential personalizer 140, for example, as described above.

A software module can be a single instruction, or many instructions, and can be distributed over several different code segments, among different programs, and across multiple storage media. Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material. Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Alternate embodiments of a computational environment 700 may have numerous variations from that described above. For example, customized hardware might also be used and/or particular elements might be implemented in hardware, software (including portable software, such as applets), or both. Further, connection to other computing devices such as network input/output devices may be employed. Software of the computational environment 700 may include code 750 for implementing embodiments of the present invention as described herein. For example, while not shown as part of the working memory 740, certain functionality of other subsystems can be implemented with any suitable combination of hardware and software, including using code 750 stored in the working memory 740.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for securing a credential using optical security features, the method comprising:
    receiving a substrate having a quasi-random optical characteristic (QROC) that is optically obscured by a physical mask, the QROC associated with an identifier;
    receiving personalization data for personalizing the substrate associated with the identifier;
    retrieving the QROC of the substrate according to the identifier, the QROC defined according to a plurality of substrate element locations (SELs) on the substrate, at least a first portion of the SELs each manifesting a first optical response, and at least a second portion of the SELs interspersed with the first SELs and each of the second portion of the SELs manifesting a second optical response that is different from the first optical response;
    computing a de-masking pattern as a function of the personalization data and the QROC, such that the de-masking pattern defines a revealed set of the SELs of the QROC and an unrevealed set of the SELs of the QROC, which together form a human-discernable representation of an authentication graphic that manifests a predetermined authentication optical response; and
    de-masking portions of the physical mask according to the de-masking pattern, thereby forming the human-discernable representation of the authentication graphic on the substrate.

2. The method of claim 1, wherein the de-masking pattern forms the human-discernable representation by revealing only SELs that manifest the first optical response, such that the predetermined authentication optical response corresponds to the first optical response.

3. The method of claim 1, wherein de-masking portions of the physical mask comprises ablating portions of the physical mask to reveal a subset of the SELs defined according to the de-masking pattern.

4. The method of claim 1, wherein de-masking portions of the physical mask comprises altering the transmittance of the physical mask to at least partially reveal a subset of the SELs defined according to the de-masking pattern.

5. The method of claim 1, further comprising:
manufacturing the substrate comprising:
forming the substrate;
measuring the QROC over at least a region of the substrate;
storing the measured QROC in association with the identifier to record the QROC; and
obscuring the QROC by forming the physical mask over at least the region of the substrate.

6. The method of claim 1, further comprising:
manufacturing the substrate comprising:
generating a QROC pattern to be substantially unique to the substrate;
forming the substrate to comprise the QROC pattern;
storing the generated QROC pattern in association with the identifier to record the QROC; and
obscuring the QROC by forming the physical mask over at least the region of the substrate.

7. The method of claim 1, wherein the substrate comprises a surrounding material having material inclusions therein, one of the surrounding material or the material inclusions defining the first portion of the SELs, and the other of the surrounding material or the material inclusions defining the second portion of the SELs.

8. The method of claim 1, wherein the substrate is formed with a first layer manifesting the first optical response, and a second layer manifesting the second optical response.

9. The method of claim 8, wherein the first layer is formed by printing the plurality of first portion of the SELs on the second layer.

10. The method of claim 8, wherein the first layer is formed on the second layer, and the first layer has first regions that define the first portion of the SELs and second regions that reveal underlying portions of the second layer, thereby defining the second portion of the SELs.

11. The method of claim 1, wherein the first optical response is a first color and the second optical response is a second color.

12. The method of claim 1, wherein the first optical response is a first transmittance and the second optical response is a second transmittance.

13. The method of claim 1, wherein the first portion of the SELs comprises a plurality of pixels each manifesting the first optical response.

14. The method of claim 1, wherein the first portion of the SELs comprises a plurality of alphanumeric characters quasi-randomly arranged on the substrate, each character manifesting the first optical response.

15. The method of claim 1, wherein the first portion of the SELs comprises a plurality of geometric elements quasi-randomly arranged on the substrate, each geometric element manifesting the first optical response.

16. The method of claim 1, wherein the human-discernable representation is a half-tone representation of the authentication graphic.

17. The method of claim 1, wherein the authentication graphic is personalized to the credential holder according to the received personalization data associated with the substrate.

18. A credential substrate comprising:
a plurality of first substrate element locations (SELs) each manifesting a first optical response;
a plurality of second SELs interspersed with the first SELs and each manifesting a second optical response that is different from the first optical response,
wherein the SELs define a quasi-random optical characteristic (QROC) of the substrate, which is recorded and associated with an identifier of the substrate during manufacturing of the substrate; and
a physical mask formed over, and optically obscuring, at least a portion of the first and second SELs, the physical mask having a structure partially formed by a de-masking operation, according to a de-masking pattern computed as a function of the QROC and personalized data associated with a credential holder of the substrate, thereby forming, from a revealed set of the SELs, a human-discernable representation of an authentication graphic that manifests a predetermined authentication optical response.

19. A credential manufacturing system, the system comprising:
a personalization processor that operates to:
receive a substrate having a quasi-random optical characteristic (QROC) that is optically obscured by a physical mask, the QROC associated with an identifier;
receive personalization data for personalizing the substrate associated with the identifier;
retrieve the QROC pre-associated with the identifier of the substrate, the QROC defined according to a plurality of substrate element locations (SELs) on the substrate, at least a first portion of the SELs each manifesting a first optical response, and at least a second portion of the SELs interspersed with the first SELs and each manifesting a second optical response that is different from the first optical response; and
compute a de-masking pattern as a function of the personalization data and the QROC, such that the de-masking pattern defines a revealed set of the SELs of the QROC and an unrevealed set of the SELs of the QROC, which together form a human-discernable representation of an authentication graphic that manifests a predetermined authentication optical response; and
a de-masker that operates to de-mask portions of the physical mask according to the de-masking pattern, thereby forming the human-discernable representation of the authentication graphic on the substrate.

20. The credential manufacturing system of claim 19, further comprising:
a substrate former, in communication with the personalization processor, that operates to:
produce the substrate to comprise the plurality of SELs that defines the QROC of the substrate; and
form a physical mask over, and thereby optically obscure, at least a portion of the first and second SELs.

* * * * *